March 21, 1939.   P. F. SCOFIELD   2,151,534
MULTIPLE TURN POSITION INDICATOR
Filed May 12, 1937
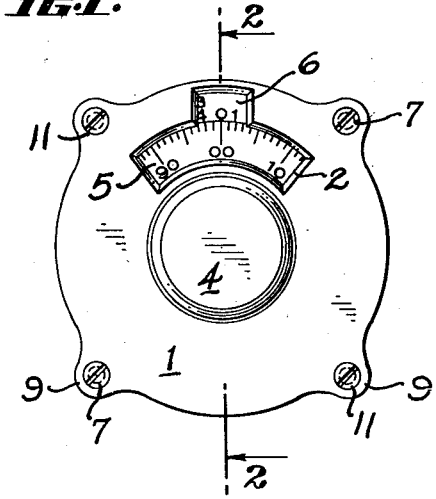
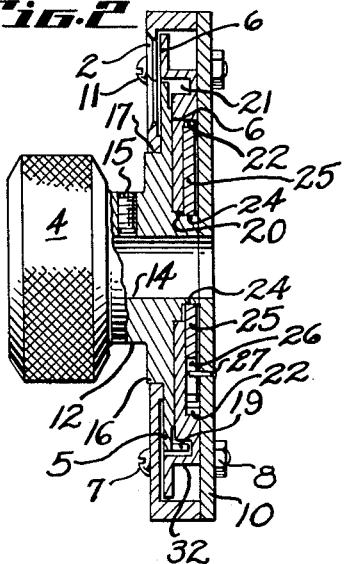
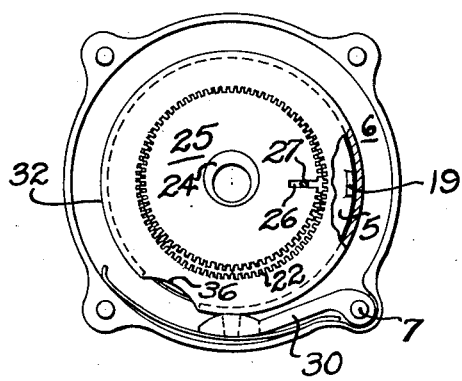
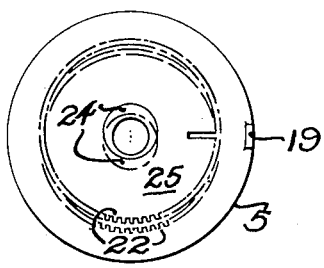
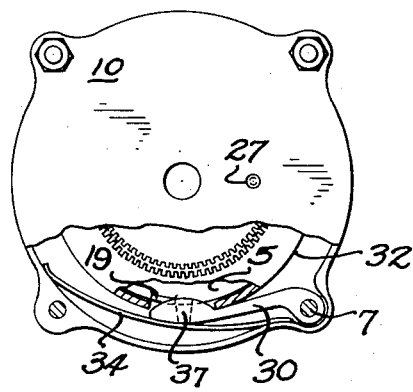
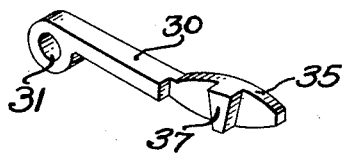
INVENTOR.
PHILIP F. SCOFIELD.
BY Lippincott & Metcalf
ATTORNEYS.

Patented Mar. 21, 1939

2,151,534

UNITED STATES PATENT OFFICE 2,151,534

MULTIPLE TURN POSITION INDICATOR

Philip F. Scofield, Palo Alto, Calif., assignor to Heintz & Kaufman, Ltd., San Francisco, Calif., a corporation of Nevada Application May 12, 1937, Serial No. 142,312

1 Claim. (Cl. 116—124)

My invention relates to vernier mechanisms, and particularly to means for cumulatively indicating a plurality of complete and fractional turns of a shaft.

Among the objects of my invention are: to provide an efficient mechanism for indicating turns and fractions of turns of shafts for apparatus utilizing screw driven contacts; to provide a dial registering the position in whole and fractional turns of apparatus in which a shaft may be turned a plurality of times; to provide a simple and efficient turn registering device; to provide a whole and partial revolution indicating scale wherein the visual scales shall be in close relation to each other; and to provide such a scale in simple form and of easily procurable materials.

Other objects of my invention will be apparent or will be specifically pointed out in the description forming a part of this specification, but I do not limit myself to the embodiment of the invention herein described, as various forms may be adopted within the scope of the claim.

My invention comprises a shaft-receiving knob having an indicating dial and an eccentric formed integrally therewith, a gear actuated by the eccentric, and a cumulative dial advanced differentially by the eccentric-actuated gear.

Referring to the drawing:

Figure 1 is a front view of the assembly.

Figure 2 is a partial section taken along line 2—2 of Figure 1.

Figure 3 is a rear view of the assembly with cover plate removed.

Figure 4 is a rear view in partial section showing details of the stop mechanism.

Figure 5 is a schematic illustration of the relation of the eccentric-actuated gear and the cumulative dial.

Figure 6 is an enlarged perspective view of the stop pawl.

A large number of designs for vernier dials and such have been developed involving frictional or gear drives, but less attention has been given to means for indicating the number of turns of a shaft which drives a mechanism directly but over a plurality of revolutions.

My device may be better understood with reference to the figures.

In Figure 1, the mechanism is shown enclosed in a rounded frame 1 which has a dial-viewing aperture 2 disposed above the knob 4. Aperture 2 is shaped and positioned so that the graduated dial 5, which is formed integrally with knob 4, is partly visible, and a portion of cumulative dial 6 is also visible therethrough. Dial 5 is graduated into one hundred parts, and cumulative dial 6 into thirty-five parts, each of which corresponds to one complete revolution of dial 5. Bolts 7 pass through apertured ears 9, circumferentially positioned about the frame 1, and serve with nuts 8 to hold a back cover plate 10 in position. Bolts 11, positioned in alternate ears 9, are used to attach the assembly to a panel or bracket, not shown.

In the sectional view of Figure 2, the construction of the knob assembly is shown. This assembly, formed in one piece from easily worked material such as aluminum, comprises the knob 4 and a shaft 12 having a central bore 14 therein of suitable size to receive an instrument shaft, not shown, to be controlled by the dial assembly. A setscrew 15 is threadably engaged with shaft 12 to hold the shaft to be controlled fixedly within bore 14. A shoulder 16 engages rotatably a circular bore 17 through frame 1, whereby the axial position of the knob assembly is maintained. Dial 5 extends radially beyond the shoulder 16, and has a stop lug 19 extending rearwardly from its edge. Behind dial 5 is provided a shoulder 20, about which is revolvably positioned dial 6. Dial 6 is positioned concentrically about and flush with dial 5.

Directly behind the periphery of dial 5, a groove or recess 21 is concentrically formed in dial 6 and in which the stop lug 19 is free to move when dial 5 rotates. The portion of the face of dial 6 peripherally bounded by the groove 21 is also recessed by the depth of dial 5, against the back of which this recessed central portion slidably rotates. The rear face of dial 6 is also recessed, and gear teeth 22 are cut therein, concentrically about bore 14.

Immediately rearward of shoulder 20, about which dial 6 revolves, a circular shoulder 24 is formed eccentrically about bore 14. About this circular eccentric 24 is disposed revolvably a gear 25, having a radial slot 26 therein, having two less teeth than the number of teeth 22 in the rear recess of dial 6, and of diameter somewhat less than that recess. A pin 27, fixed in the rear cover plate 10, projects into slot 26.

When knob 4 rotates a fraction of a turn, scale 5 indicates the amount thereof. At the same time, the eccentric 24 causes gear 25 to move in a path concentric with bore 14, but pin 27 cooperates with slot 26 to prevent rotation of the gear relative to said bore. Eccentric 24 is of such size as to cause the gear 25 to engage with the teeth 22 in the rear recess of dial 6 on the side of said eccentric having the greatest radius. Due to the fewer number of teeth on the gear 25, the dial 6 is rotated a certain amount for each rotation of the eccentric 24. With the gear ratio utilized, 68:70, the dial 6 is moved one thirty-fifth of a revolution forward for each complete turn of dial 5.

Figure 3 shows these relations, being a rear view of the assembly with the cover plate 9 removed. Figure 5 is a schematic diagram showing the dial 5 and the gear 25 in working relationship, with dial 6 removed, and the position of the gear teeth 22 on said dial 5 indicated by a dotted line, for two positions of the eccentric.

Means are provided to stop rotation at either end of the cumulative scale, through the action of a pawl 30, shown in enlarged form in Figure 6. The bored end 31 of the pawl pivots about bolt 7, while the curved opposite end 35 rides upon a shoulder 32 cut on the rear of dial 6. Shoulder 32 is concentric with shaft 12, and the pawl 30 is pressed against the said shoulder by a flat spring 34. A recess 36 is cut into the shoulder 32 of dial 6, said recess being curved to fit the curved end 35 of pawl 30, and of sufficient size that when the end 35 of the pawl 30 engages therewith, a stopping segment 37, integral with the rounded end 35 of the pawl, is in position to intercept the stop lug 19 on the rear of dial 5.

Figure 3 shows the pawl riding on the shoulder, and Figure 4 shows, in partial section, the engagement of lug 19 with segment 37 when the pawl has engaged with recess 36.

It is of course to be understood that any desired ratio of gear teeth may be used, and the dials may be graduated in any manner suitable.

Summarizing, my invention provides a simple, compact, and easily constructed method for indicating the number of revolutions of a shaft: The connection between turning knob and shaft to be turned is direct and fixed, eliminating lost motion and wear of driving gears, while the gears associated with the indicating dials carry no load, thus keeping the dial readings accurate throughout the life of the assembly.

I claim:

A position indicator, comprising a turning knob having a central bore and a setscrew therein for rigid attachment to a shaft to be controlled, an enclosing frame, an inspection port through said frame, a partial-turn dial integral with said knob, a graduated scale thereon in registry with said inspection port, a cumulative whole-turn dial concentrically revolvable about said partial-turn dial, a graduated scale thereon in registry with said inspection port, an internal gear in said cumulative dial, an eccentric integral with said turning knob, an idler gear actuated by said eccentric, said idler gear being so positioned and arranged as to engage said internal gear in the direction of greatest eccentricity, a rear cover plate, a pin therein, and a radial slot in said idler gear positioned to receive said pin, a stop mechanism operable upon a complete revolution of said whole-turn indicating dial, comprising a lug extending rearwardly from said part-turn indicating dial, a groove formed concentrically within said whole-turn indicating dial wherein said lug may move, a shoulder surrounding said groove, a pawl, a spring positioned to press said pawl against the periphery of said shoulder, a recess formed in the periphery of said shoulder, said recess being curved to receive said pawl and forming a port into said concentric groove, and a projection formed upon said pawl adapted to engage said lug when said pawl is in registry with said peripheral recess.

PHILIP F. SCOFIELD.